E. FORLANINI.
HYDROFLYING MACHINE.
APPLICATION FILED APR. 6, 1905.
1,112,405.
Patented Sept. 29, 1914.
9 SHEETS—SHEET 5.
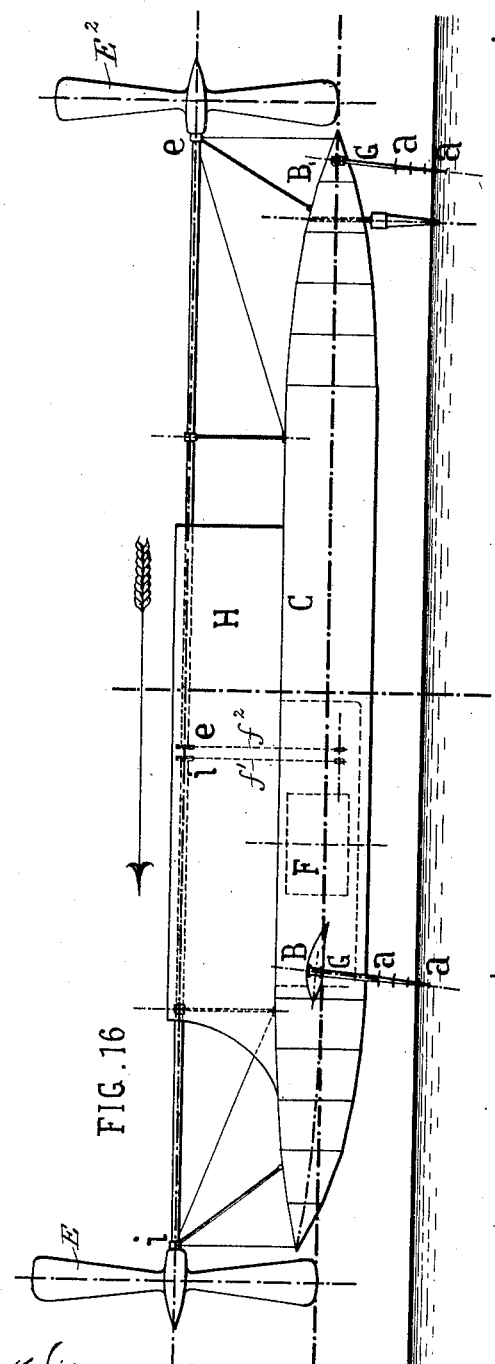
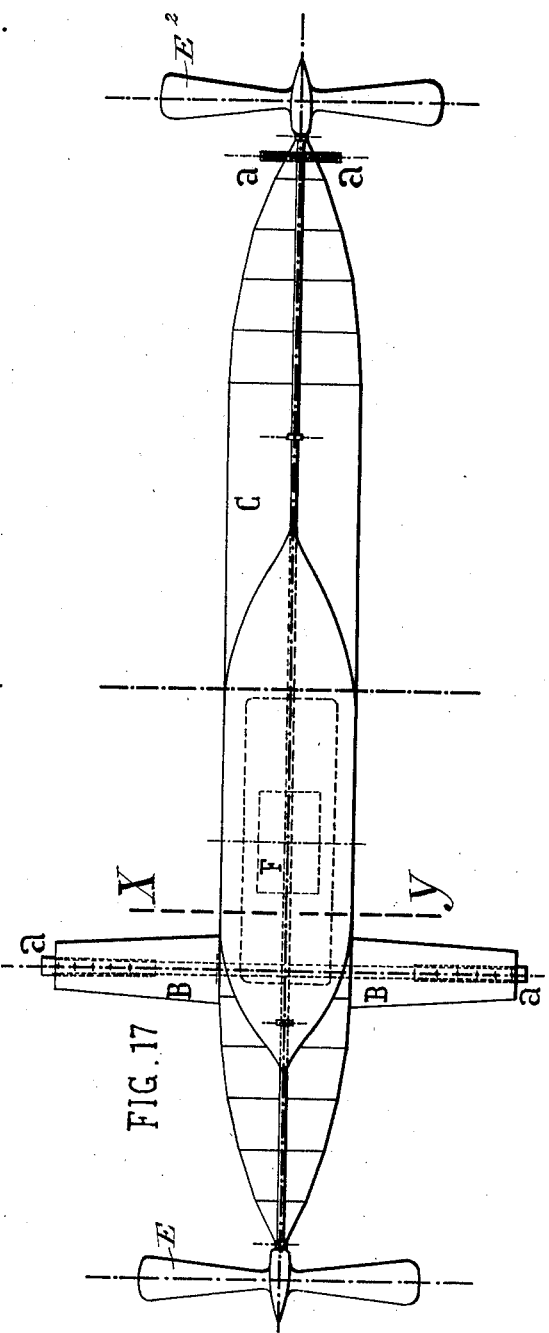

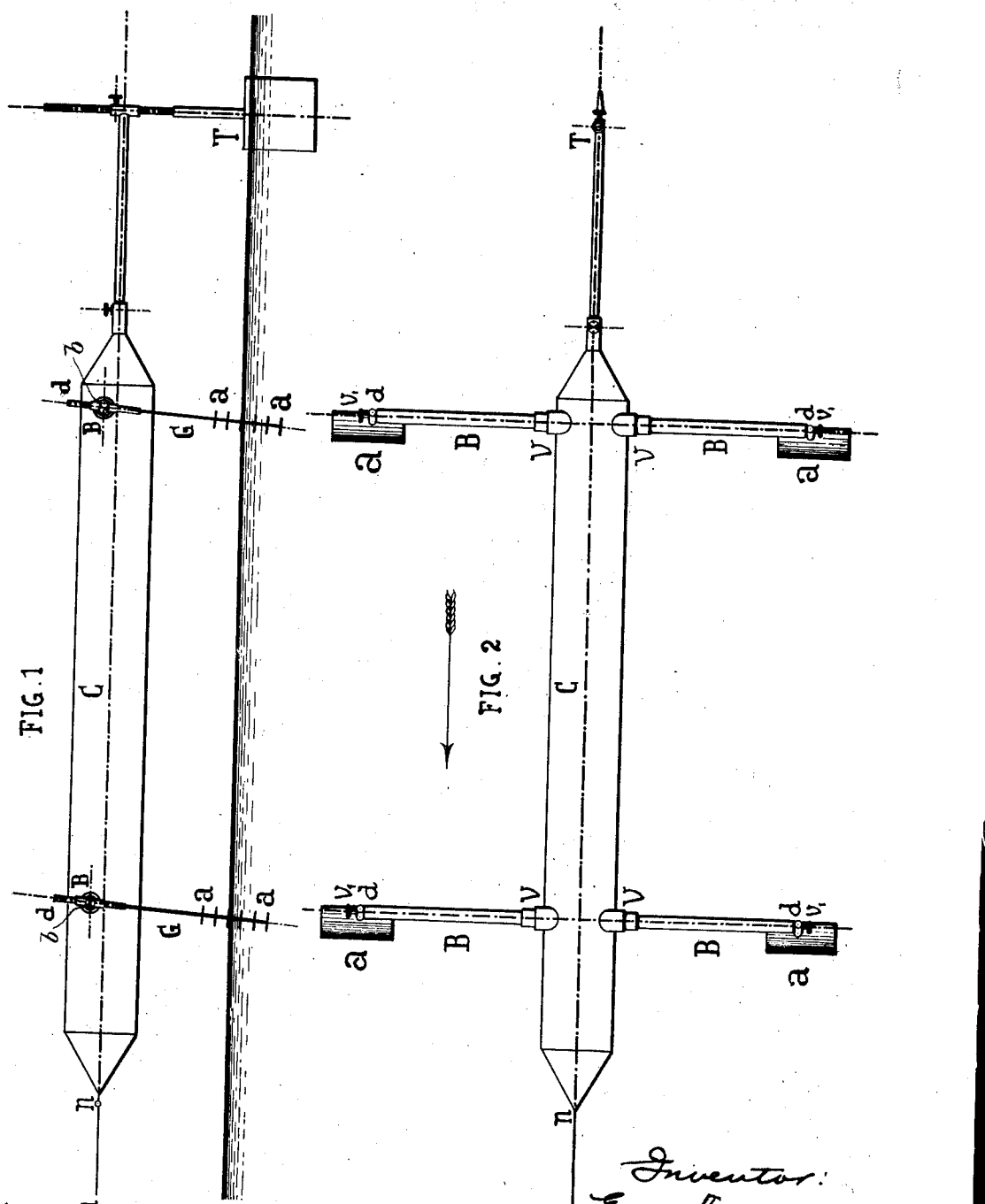

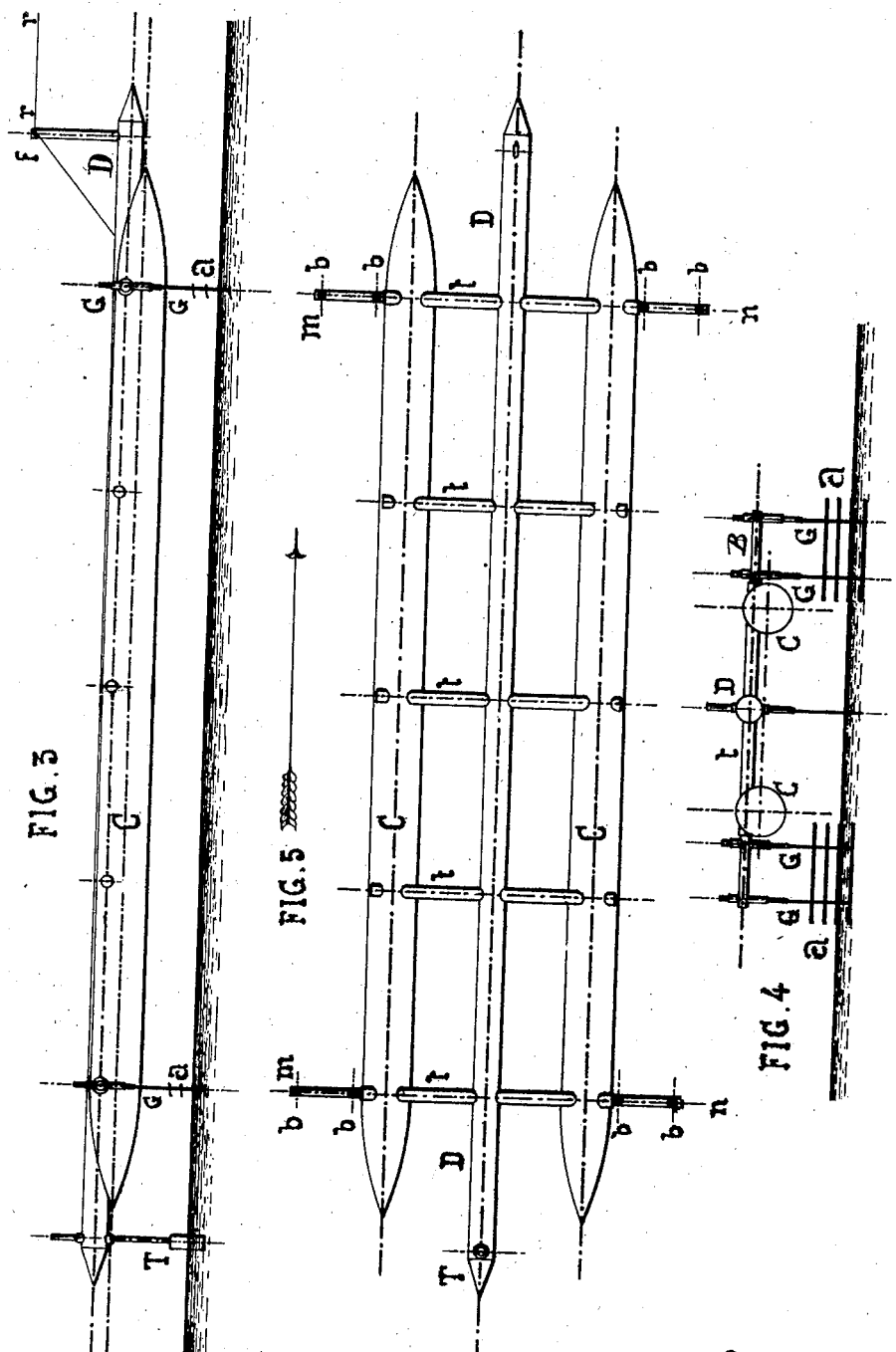

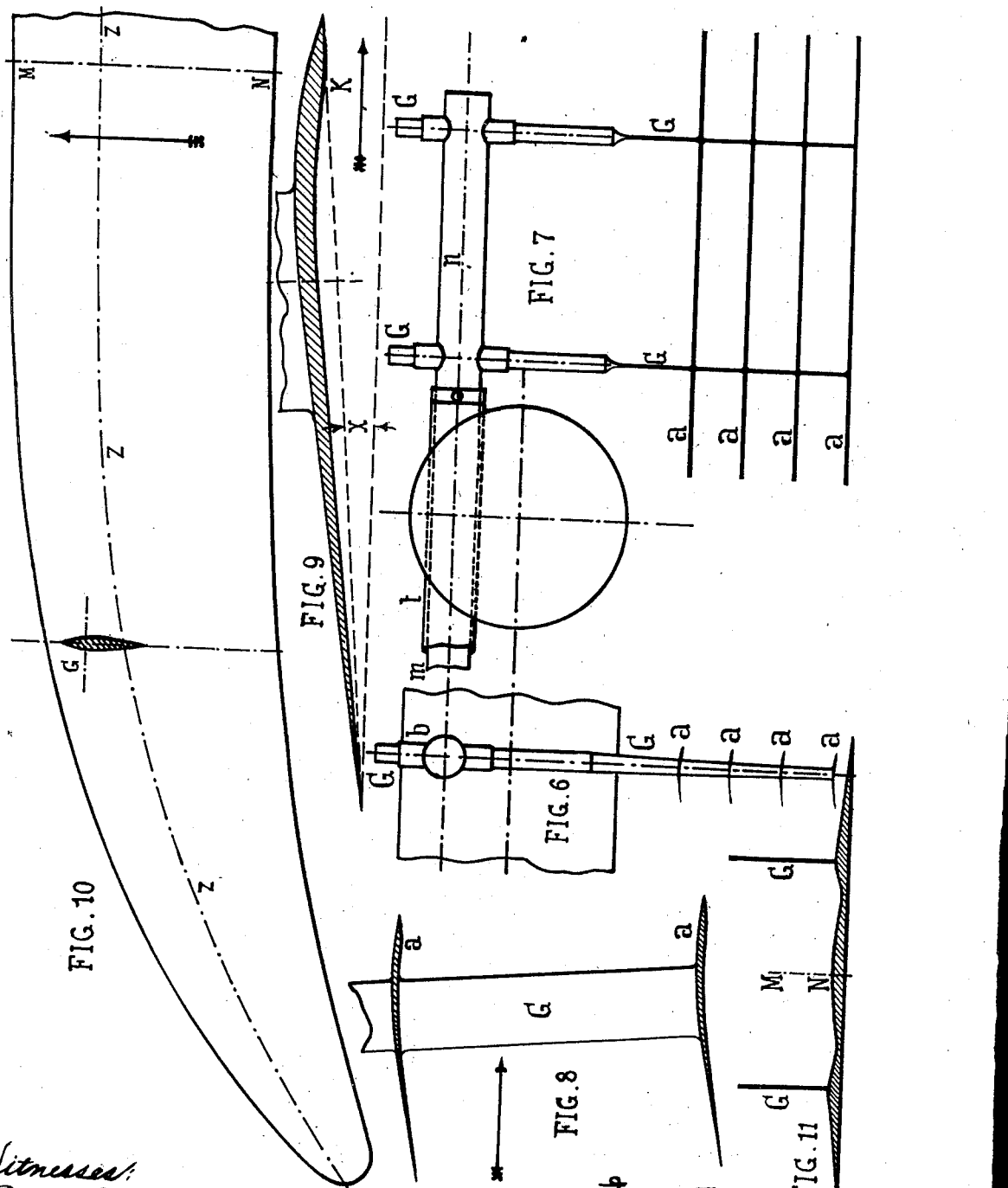

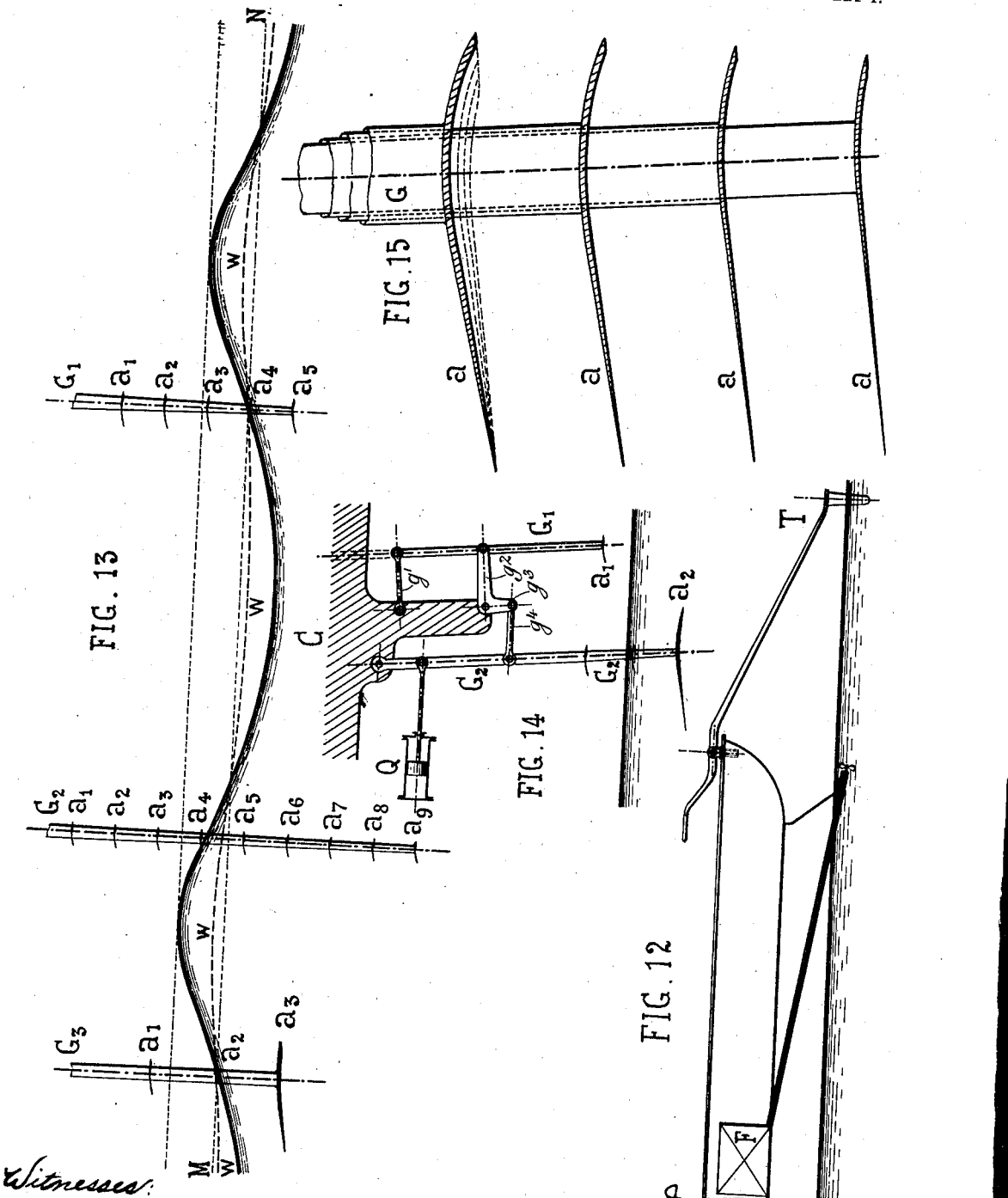

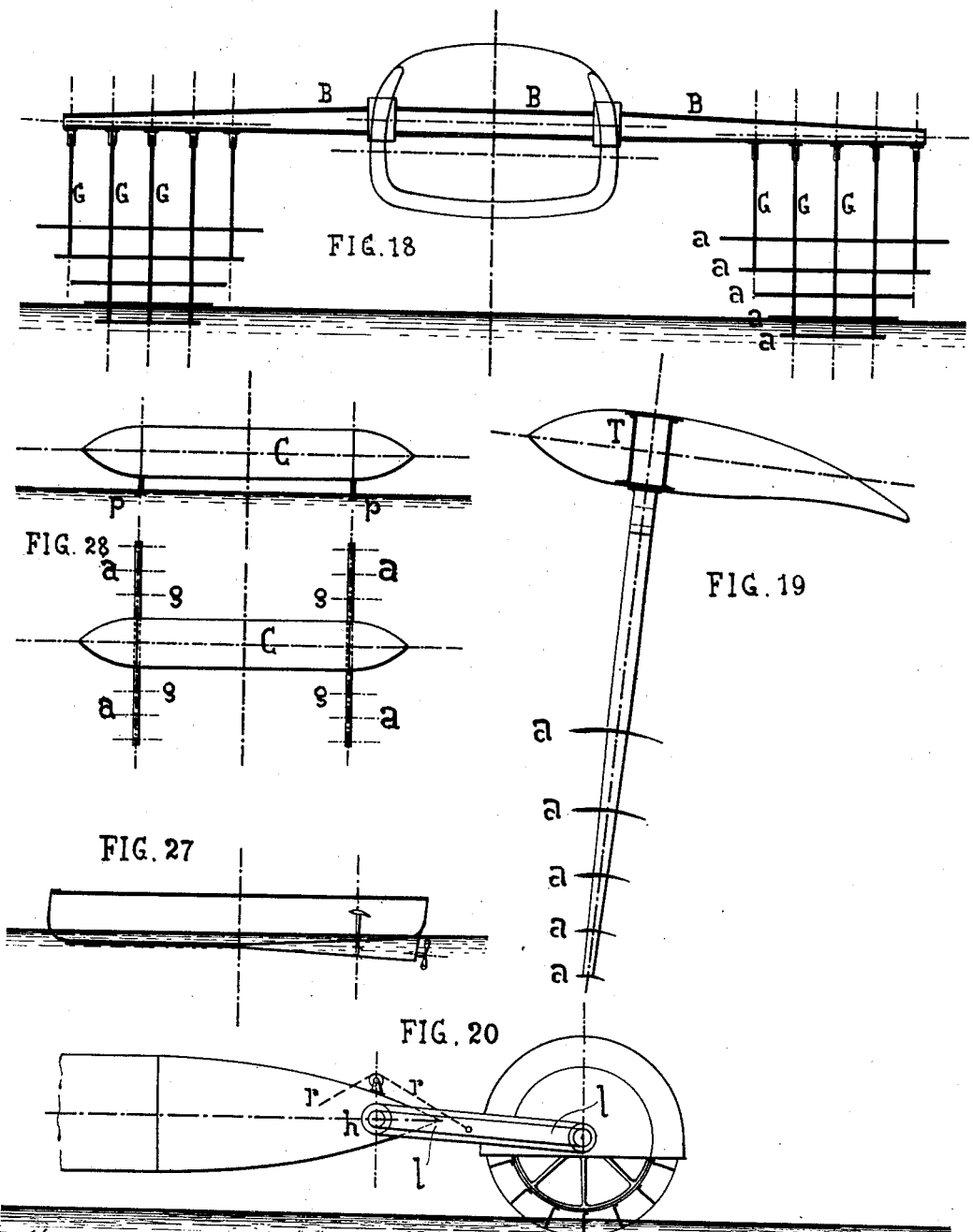

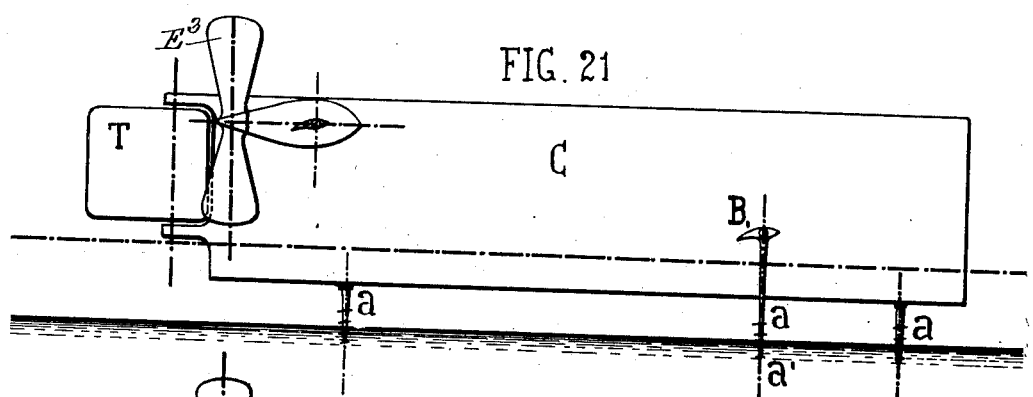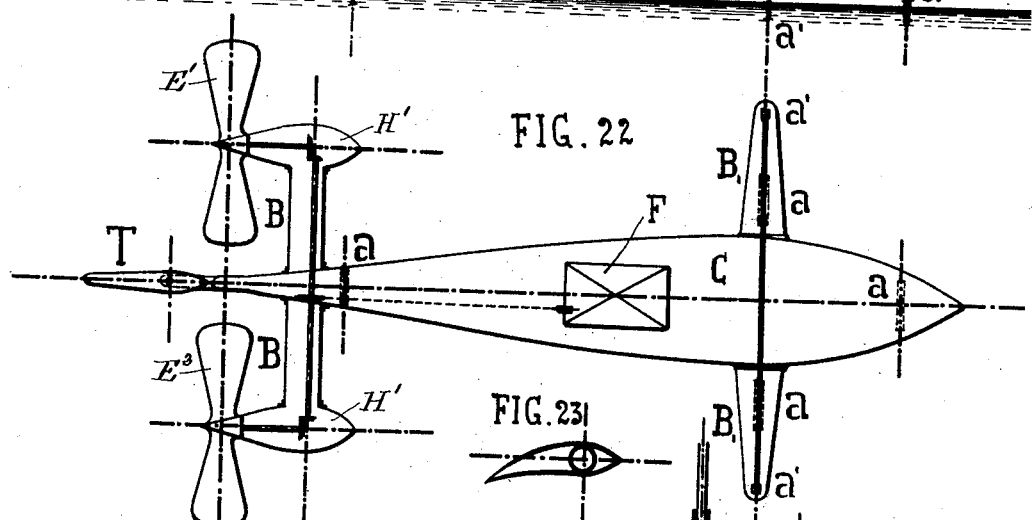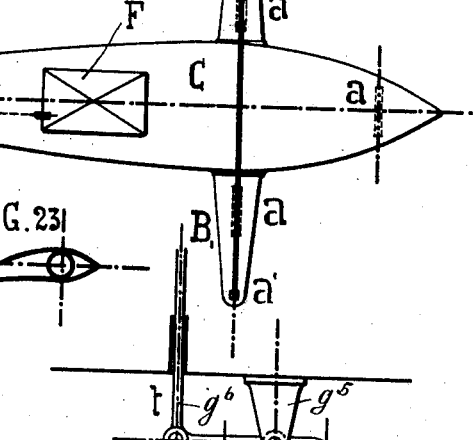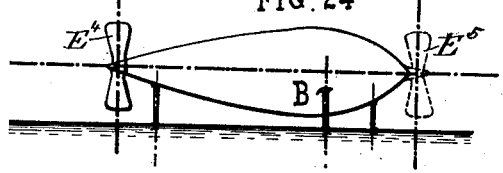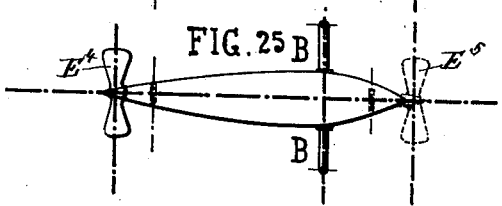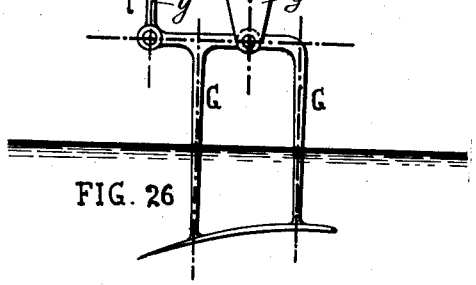

E. FORLANINI.
HYDROFLYING MACHINE.
APPLICATION FILED APR. 6, 1905.

1,112,405.

Patented Sept. 29, 1914.
9 SHEETS—SHEET 8.

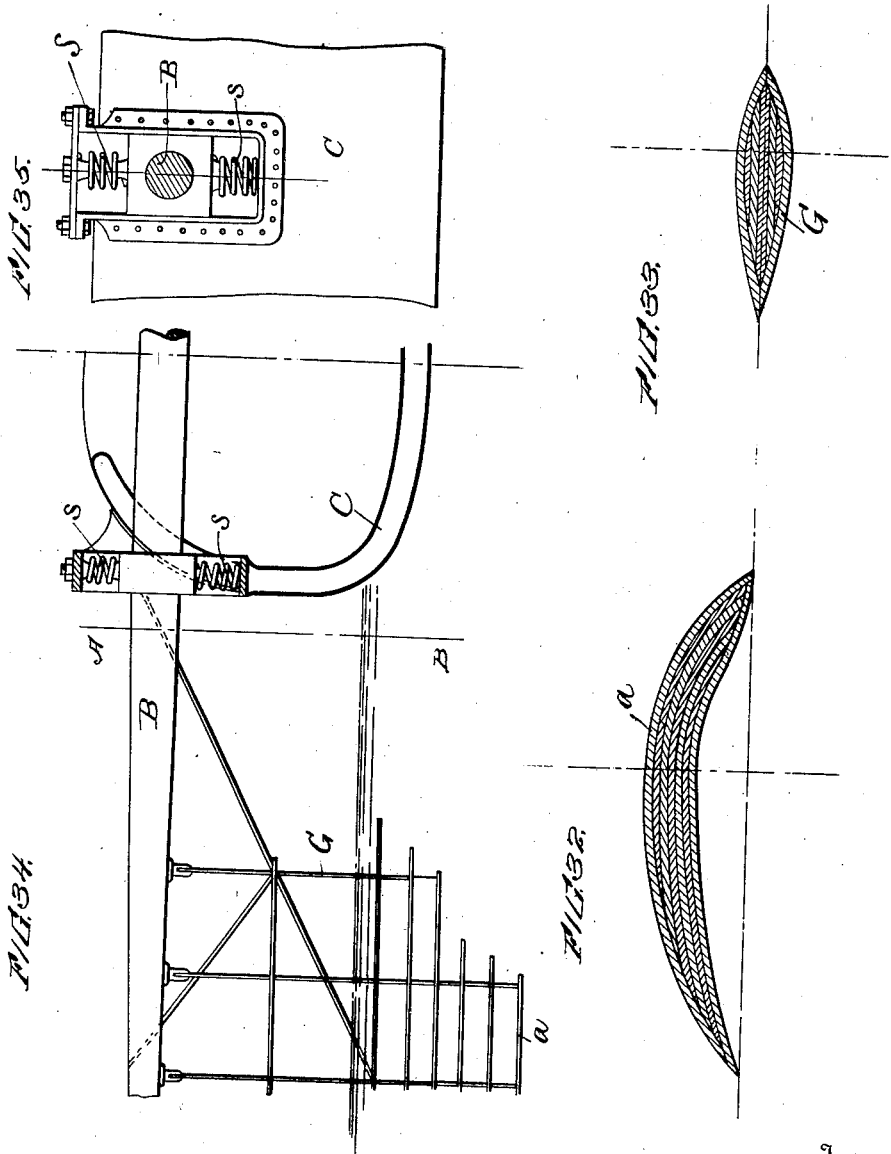

UNITED STATES PATENT OFFICE.

ENRICO FORLANINI, OF MILAN, ITALY.

HYDROFLYING-MACHINE.

1,112,405.  Specification of Letters Patent.  Patented Sept. 29, 1914.

Application filed April 6, 1905. Serial No. 254,174.

*To all whom it may concern:*

Be it known that I, ENRICO FORLANINI, mechanical engineer, subject of the King of Italy, residing at 21 Via Boccaccio, Milan, Italy, have invented certain new and useful Improvements in Hydroflying-Machines; and I do hereby declare the following to be a full, clear, and exact description of the invention, such as will enable others skilled in the art to which it appertains to make and use the same.

My invention relates to improvements in apparatus for flying above the water as well as in the air, and the object of said improvements is a machine supported not by static but by dynamic reaction of the water or of the air or of both, exerted upon surfaces connected in any convenient manner with the body of the apparatus.

A complete machine construction according to the present specification is able to travel in three different ways, that is: (1) with the body floating on the water, (2) with the body in the air and some supporting surfaces in the water, and (3) with all its parts in the air. It is understood that machines constructed according to my improvements may also be used for traveling at all times in contact with the water, in which case the surfaces utilizing the dynamic reaction of the air can be dispensed with.

In the following specification, besides a description of different forms of my apparatus, hereinafter designated as a hydroflying machine, I will give an explanation of the theoretical condition upon which its working is dependent, and of the reasons which have led to the adoption of the proportions and forms hereinafter described.

Figure 29:
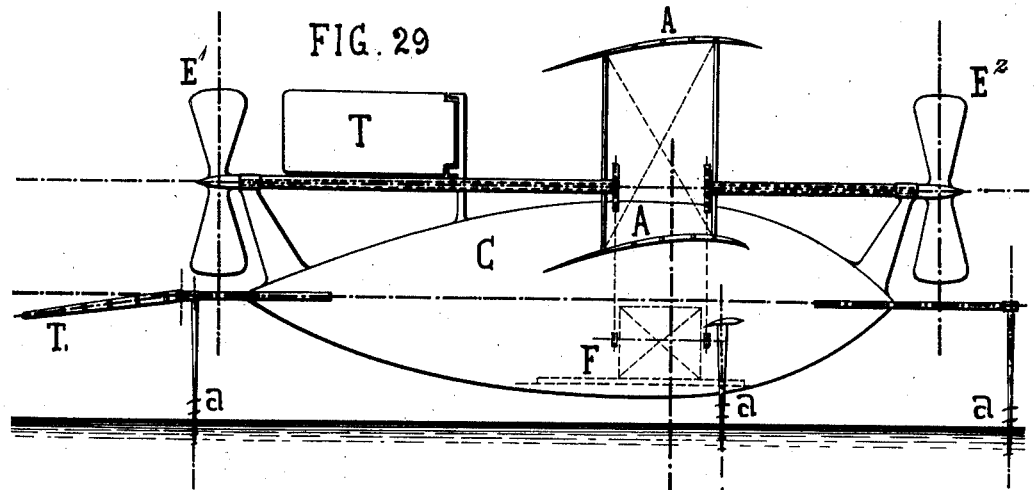
Figure 30:
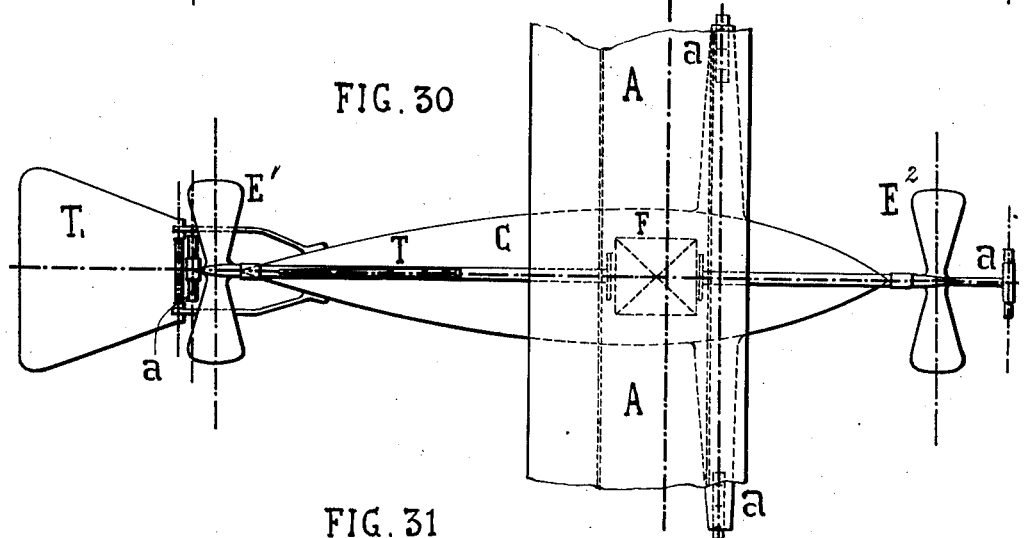
Figure 31:
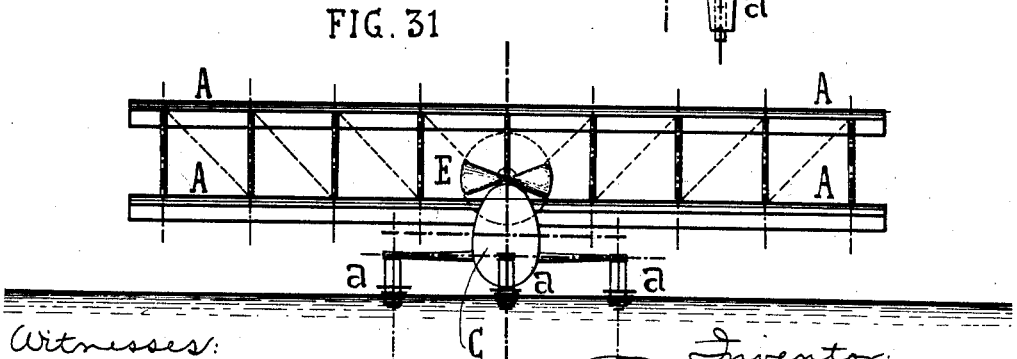

In the accompanying drawings: Figure 1 is a side view of a little model based on my invention; Fig. 2 is a plan view of the same; Fig. 3 is a side view of an apparatus capable of supporting two persons; Fig. 4 is a front view of the same; Fig. 5 is a plan of the same; Figs. 6 to 11 illustrate details of the apparatus shown in Figs. 3 to 5; Fig. 12 shows my apparatus provided with screw propeller; Fig. 13 is a diagrammatical view illustrating the condition of the blades of my apparatus in wavy water; Fig. 14 is a detail view of mechanism for automatically adjusting the slope of the blades; Fig. 15 shows a special construction of the blade supports; Fig. 16 is a side view of a self-propelling hydro-flying machine; Fig. 17 is a plan view, and Fig. 18 is a front view of Fig. 16; Fig. 19 is a detail view illustrating the blades and their support, as used in the apparatus of Figs. 16 to 19; Fig. 20 shows a modified form of propelling means; Fig. 21 is a side view of a further modification of my apparatus; Fig. 22 is a plan of Fig. 21; Fig. 23 shows a detail of Fig. 21; Figs. 24 and 25 show a further modification of my apparatus in side and plan view; Fig. 26 illustrates a modification of the blades and their support; Fig. 27 is a diagrammatical view illustrating the use of my blades in boats; Fig. 28 shows a side view and plan of a further modification of my apparatus; Fig. 29 is a side view of a modification of my apparatus which is designed to be operated as a flying or half-flying machine; Fig. 30 is a plan view; Fig. 31 is a front view of Fig. 29; Fig. 32 is a section of a blade consisting of soldered lamellæ, Fig. 33 is a section of a rod consisting of soldered lamellæ, Fig. 34, a sectional elevation showing the resilient supports for the supporting members or beams, and Fig. 35, a transverse vertical section on line A—B of Fig. 34.

Similar letters of reference refer to similar parts throughout the different views.

For the purpose of better explaining my invention, I will at first describe some forms of my apparatus which are provided only with surfaces utilizing the dynamic reaction of the water, and are not able therefore to travel in the air alone; these forms of my apparatus being intended to remain in contact with the water, can have also propellers and rudder acting upon the water. In the Figs. 1 and 2 I have shown a first example of such kind of machine, consisting of a tubular body portion C of sheet metal such as iron, provided at both ends with conical extensions, the purpose of which is to decrease the resistance of the air. Near its front and rear, the body portion C is provided with a pair of laterally extending tubular arms B B screwed into suitable sockets *v v*. At their outer extremities said arms B B are provided with rods or legs G G the upper tubular portions *d d* of which are guided in forwardly inclined sockets *b b* rigidly connected with the arms B B. Set screws *v' v'* are arranged to hold said legs in their places. Each leg or rod G is provided with a plurality of slightly concave blades $a\ a$ arranged substantially perpendicular to the leg. These blades are inclined backward and downward so that the water, during the forward travel of the machine, will exert sufficient pressure on their under surfaces to support the body portion C above the surface. To adjust the angle of inclination of the blades at will and according to the requirements of the travel, the arms B B can be turned about their longitudinal axis. The apparatus illustrated in these figures is not provided with a propeller of its own, but is designed to be towed by a boat or the like, a rope $m\ n$ being provided for this purpose. I may state here that a model constructed according to Figs. 1 and 2 and having a weight of five kg. or eleven pounds, being towed at a speed of one to three meters per second, the elevation of the body portion C above the surface of the water varied between three and six inches according to the speed, the number of submerged blades varying with the speed, and the resistance of the apparatus, measured by the tension of the rope $m\ n$, not exceeding 700 g. or about one pound and a half, that is about $\frac{1}{7}$ of the total weight of the apparatus.

In Figs. 3 to 11 I have illustrated a second example of the same kind of apparatus, but designed to support two persons. Its body portion consists of two sheet metal tubes C C having pointed ends and a tube D of smaller diameter and greater length than the tubes C, C. The tubes C, C and D are connected to one another by means of tubular cross bars $t, t$. The tube D is provided with a rudder T and, at its stem, with a vertical rod, to which a rope $m, n$ is affixed by means of which the apparatus can be connected to a motor boat or the like to be propelled thereby. The tubes C, C are provided at their front and rear, with laterally extending arms B, B revolubly mounted in the first and last one of the cross bars $t, t$. At their projecting portions the arms B are provided with legs G G extending downward therefrom and having adjustable supports in suitable sockets $b, b$. Each pair of legs G G is provided at its lower end with a plurality of blades $a, a$ arranged one above the other at suitable distances from one another and inclined, as explained with reference to Figs. 1 and 2.

In order to explain my invention, I shall give certain results of my investigations referring to the subject matter of the same. It has been demonstrated that the weight $p$ that can be supported by a certain blade having a certain inclination is substantially proportional to the square of its speed ($v^2$). The resistance $s$ of the blade during the travel of the machine, which is to be overcome by the propeller, is also substantially proportional to the square of the speed ($v^2$). The resistance of a number of superimposed submerged blades is therefore proportional to said number. If now my machine travels at an increasing speed ($v$) the number of the supporting blades traveling below the surface of the water will decrease proportionally to the square of the speed ($v^2$). There is, therefore, an increase of the resistance of the machine proportionally to $v^2$, on account of the increased resistance of the different blades and at the same time a decrease of the resistance of the machine also proportional to $v^2$, on account of the decreased number of submerged blades. It follows, therefore, that the resistance of the machine is independent of its speed, and that, furthermore, the energy required for propelling my machine is proportional to its speed. This conclusion is also applicable theoretically to other machines sustained more or less but never totally by the dynamic reaction of the water, but for such other machines the reality does not respond to the theory, because the surface emerging from the water with the increasing of $v$ remains always very near to the water and therefore always more or less exposed to its resistance, this fact annulling the principal characteristic of such kind of apparatus that is to be exposed to a resistance $s$ constant and independent from $v$. My apparatus on the contrary is provided with water-blades which are disposed at different levels in such a way that when, by the increasing of $v$, some or all of them become superfluous as supports of the apparatus and withdraw from the water, they get far away from the same and are entirely and continually out of contact therewith. My apparatus realizes therefore and for the first time, practically and effectually the above mentioned law on the constancy of the resistance independently of $v$.

It will readily be understood that the values $p$ and $s$ vary according to the depth to which the blade is submerged and they have their smallest measure when the blade just glides with its front edge over the surface of the water. The values are increased by 60% if the blade is what may be termed a deep blade, that is, if it is submerged to a depth about equal to its length, the length of the blade being in this case its dimension in the line of travel. The values $p$ and $s$ are also dependent upon the inclination (X) of the blade to the line of travel; and I have found that a blade is most efficient, that is, that its value $\frac{P}{S}$ has its greatest measure, when inclined at an angle X of about 0.06 the radius being taken as unity or 3° 30′ measured in degrees. The efficiency is also affected by the shape of the blade and, generally speaking, it increases with the proportion of its breadth to the length; but for practical purposes, it is found to be most satisfactory if its lateral dimension is about five to eight times as large as its dimension measured in the line of travel. A further increase of the lateral dimension will still result in a further, although very slow, increase of the efficiency, so that, under certain circumstances, the proportion of the lateral to the longitudinal dimension could be also a hundred or more to one.

I prefer to use concave blades, disposed with their concave side downward, and I attain the best results with blades having the maximum cavity at about one third of the longitudinal dimension of the blade, from the front edge, the height of the arch being one twentieth of the same longitudinal dimension in the line of travel.

In Figs. 6 to 11 I have illustrated in detail the most advantageous form of the blades of my apparatus and their supports which form I have found by extended experiments. Figs. 6 to 8 show a suitable connection of the blades with the legs G. In the present example, each blade $a$ is connected with both legs G G mounted on the laterally extending arms B B, the connection being obtained through simple piercing and welding without any screws or the like. To diminish their resistance to the water, the legs or rods G G are made of lenticular, preferably unsymmetrical cross-section, the maximum thickness being at about $\frac{1}{3}$ the distance from the front edge. To minimize said cross-section, the legs are arranged to coincide with the resultant of the pressure of the water on the blades, whereby the cross section can decrease downward. That is to say, the legs or rods are connected to the blades substantially along the geometrical locus of the centers of the water pressure of the longitudinal elements of the blades formed by dividing the same by imaginary vertical planes parallel to the direction of travel. In the case of the blades being connected to a single rod or leg, the point of connection is substantially at the center of pressure on the blade. The proportion of the thickness to the length of the legs is advantageously very small, in any case not more than $\frac{1}{5}$ and preferably $\frac{1}{10}$ only. The form of the blades, Figs. 9, 10 and 11 is similar to that of the wings of birds; the edges of the same should be as sharp as possible especially the posterior one. These blades are made substantially as solids of uniform resistance to the bending strain with relation to the point of connection to the legs G, G. Adjacent to the front edge I prefer to strengthen the rim by thickening or bulging its underside as shown at K in Fig. 9. I thereby prevent eddies from being caused by the movement of the water along the under side of the blade, and at the same time, I increase the stiffness of the latter. Fig. 11 shows a cross section of the blade taken on the line Z Z Z of Fig. 10, where the scale of the vertical dimension is much larger than that of the horizontal dimension. It will be seen from said figure, that for the purpose of lessening the resistance which the blade offers to the water, I make the thickness of the blade proportional to the moment of flexion to each point of its transversal cross-section. For the same purpose I dispose the supporting legs in a way that the lateral ends of each blade remain free outside said legs, this fact allowing a further reduction of the thickness of the blades. For the same purpose, I construct the blades $a$ and also the legs G of the best steel and preferably of saw-blades, soldered together, as shown in Figs. 32 and 33, where the vertical dimensions are on a much larger scale than the longitudinal ones, said saw-blades having a resistance up to 200 kg. per $mm^2$ whereby I can use thinner blades and legs. The blades and legs should also be highly polished, and coated with a non-corrosive material, such as nickel to protect them against rusting and still more to diminish the friction.

While I have described, in referring to Figs. 1 to 5, machines having a plurality of superimposed submerged blades, I wish it to be understood that I can also use, in my machine, superficial blades, that is, blades gliding over the surface of the water. I have found, however, that in practical use the deep blades are preferable, particularly as they permit the use of my machine in rough water, as will be set forth hereinafter.

I have found some formulas, based on practical experiments, for the construction of practical and operative machines. Said formulas are:

$$P = (12 + 425X - 1250X^2)AV^2,$$

and—

$$S = (1.20 + 100X^2)AV^2.$$

From these formulas, differentiating, it results that the maximal ratio $\frac{P}{S}$ is obtained when $X = 0.063$ (the radius being here taken as unity) with which value said formula gives $$P = 34AV^2$$
$$S = 1.6AV^2,$$

and—

$$P = 21S,$$

where P is the weight of the whole of the apparatus, A the total area of the blades in square meters, V the speed of the machine in meters per second, and S the horizontal resistance of the same measured in kilograms.

It follows from the last equation that the horizontal force necessary to propel the apparatus is only one twenty-first part of the weight of the entire machine, which value has been proved, by my experiments, when somewhat modified on account of practical conditions, to be substantially correct.

The surface of the blades and their number will be found from the first one of my equations, the total surface being:

$$A = \frac{1}{34}\frac{P}{v^2},$$

or by inserting instead of P the weight T of the machine in tons, of 1000 kilograms;

$$A = \frac{30T}{v^2},$$

which, in case of the smallest useful practical measure of the speed, namely, about 18 miles per hour, gives a total surface of the blades of $\frac{1}{2}$T that is $\frac{1}{2}m^2$ for one ton of weight, which value is less than one-tenth of the area of the blades used in experiments heretofore made in the same line. The considerable advantage attained by this new departure will be apparent, when the considerable increase of the resistance is taken in consideration that results from an increase of the area of the blades.

An important principle of my machine is that, apart from the blades, as small part of the same as possible comes in contact with the water during the travel, whereby the resistance is decreased to a minimum, and therefore my apparatus is distinguished in this respect from the machines designed by prior inventors, that no part of the body comes in contact with the water. The resistance of the air is decreased as far as possible by giving the body a proper shape.

Of importance with respect to the resistance of the machine is the construction of the propeller. Firstly I will consider water-propellers, which kind of propellers is applicable, as stated heretofore, when my apparatus is not intended for traveling in the air. A screw-propeller of the size and arrangement of a propeller used in ships would, by its supports, unduly increase the resistance of the machine, so that high speeds could not be attained. I obviate this difficulty by arranging the shaft of the propeller at a large angle to the surface of the water by using a propeller of small diameter and by submerging it only to such an extent as is required to cover its blades by the water. The part of its support that is in contact with the water is therefore reduced to a minimum. The construction of a propeller of this kind is illustrated in Fig. 12 in which C is the body portion of my apparatus, E the propeller mounted in an inclined bearing $e$, and T the rudder. In quiet water, I can still further decrease the resistance of the support of the propeller, by arranging the latter with its upper half above the surface of the water. In this case, however, it is advisable to use two propellers, revolving in opposite directions, whereby the lateral pressure exerted by the blades of the propeller on the apparatus is counteracted.

To avoid totally the resistance of the water on the propellers supports, one or more paddle-wheels can be used, mounted in any suitable position. Fig. 20 shows a paddle-wheel $E^3$ disposed at the stern and mounted on a pair of beams $l$ pivotally supported on the hull C at $h$. A rope $r\ r$ can regulate the position of the wheel. Automatic regulating means may be designed by using blades similar to the blades $a$, $a$ as a support for the wheel. The resistance of the water, however, is decreased in the most efficient manner by using aerial screw-propellers as will be more fully described hereafter.

The construction of the rudder deserves also consideration. Referring to a water-rudder, it is to be stated that to decrease the resistance of the rudder, it should be made of very strong material of lenticular cross-section and of downwardly tapering and, preferably, of isosceles shape (see Fig. 12), the principles of construction being the same as those explained with reference to the construction of the blades $a$ and the legs G. During the regular travel it should be raised entirely out of the water for which purpose it is supported, for example, by a swivel bearing $t$ as shown in Fig. 12. Under certain circumstances, I may entirely dispense with the use of a rudder, the machine being steered in this case by varying the resistance of the blades of one side or the other. This can be effected, for instance, by varying the slope of the blades or by other means. It is of importance to dispose the whole or part of the supporting surface at a certain lateral distance on both sides of the body portion to insure the transversal equilibrium of the apparatus. Said distance is usually of three to four times the height of the center of gravity of the machine above the surface of the water.

The influence of the waves on the operation of the machine is illustrated in Fig. 13. It appears therefrom that, referring to one and the same leg, the number of blades submerged (connected therewith) must vary with the variations of the waves. It follows that the vertical pressure exerted by the water upon blades of one and the same leg is subject to big variations, which fact causes the machine to follow a vertically curved line as indicated by W—W instead of the straight line M—N and furthermore results in considerable and instantaneous variations in the strain of its parts. Another consequence of the above mentioned fact is that by the going up and down of the single blade-groups, also the slope of the blades varies, whereby a further variation of strains affects the system. To obviate partially these disadvantages, I may mount a large number of small blades on every one of the legs (see leg $G^2$ of Fig. 13.) and dispose them at suitable distances. It is apparent that the proportion of the number of blades, raised momentarily above the surface, to the total number of the blades, and thereby the difference in the vertical pressure, is decreased, as will appear particularly from an inspection of the legs $G^1$, $G^2$ and their blades shown in Fig. 13. Similar results are attained by the structure of the leg and its blades illustrated by the leg $G^3$ of Fig. 13. In this case one of the blades, $a^3$, has a very large area while the other blades, $a'$ and $a^2$, are comparatively small. By this arrangement, I avoid the necessity of using legs of an excessive length. In describing the blades I have called attention to the fact that the vertical pressure exerted by the water on the blades depends on the angle of inclination of the blades and on the speeds of the machine. To regulate and utilize this effect, I have developed several means. In Fig. 14 I show as an example, a supplementary blade $a'$ supported on a leg $G^1$ which will come in contact with the water as soon as the apparatus begins to sink on account of a decrease of the speed. The leg $G^1$ is supported on links $g'$ $g^2$ mounted on the body C and connected with the regulator R of the motor F to increase the speed when the blade $a'$ is moved upward by the pressure of the water. The same result can be attained by increasing the angle of the blades to the line of travel. For this purpose, the horizontal arms B in Figs. 1 and 2 and in Figs. 3 to 5 are revolubly mounted on the body portion of the machine. To render the operation automatic, I have modified the construction as shown in Fig. 14. The leg $G^2$ is pivotally supported on the body portion C or a part connected therewith. The link $g^2$ is formed as a bell crank lever having a downward extension $g^3$ connected to the leg $G^2$ by a link $g^4$. If now the body portion C is lowered, the blade $a'$ will come in contact with the water, whereby the leg $G^1$ will be moved upward and cause the leg $G^2$ to swing forward, whereby the angle of inclination of the blade $a^2$ is increased. To avoid sudden change of the slope of the blades, the operation is controlled by an oil regulated piston and cylinder Q coöperating with suitable springs or counterweights. The leg $G^1$ or $G^2$ may also be connected with the regulator of the propeller mechanism as explained above. The mechanism shown in Fig. 14 will also be used to great advantage to overcome the considerable influence of the waves on the machine. A further means to control the elevation of the machine above the water is illustrated in Fig. 15. The blades $a$, $a$ are mounted on tubular legs G telescoping one inside the other. The distance of the blades from one another can thus be varied. These tubular legs can be shifted longitudinally with relation to each other, as will be readily understood, either manually, or though suitable mechanism. The blades are thus caused to approach or to recede from each other, whereby the same variations in the supporting capacity of the blades may be attained as in the case where the respective areas of the blades are varied.

To avoid vibration I provide springs, $s$ $s$ between the supporting members or arms, B, and the body portion or hull C, of the machine, as indicated in Figs. 34 and 35.

In the foregoing I have explained the principle of my invention. In the following I will describe other and more complete forms of construction of my machine. In Figs. 16 to 19, C represents the body portion of an apparatus, built approximately in the form of a boat. It is provided with a suitable wind guard H to protect the passengers and at the same time to diminish the air-resistance. Near the stem arms in the forms of beams B are mounted crosswise of the hull and extend laterally therefrom. They are preferably covered with a jacket $b''$ of sheet metal having the form of the cross-section of a bird's wing. At their outer extremities, said beams are provided with legs G supporting superimposed blades $a$, $a$. I prefer to use a plurality of legs G on both sides of the body portion C; whereby I can construct the blades $a$ $a$ of very thin material. A beam B' of small length is provided at the stern of the hull; the legs G, connected with this beam, carry blades $a$ which are disposed immediately under the hull. The apparatus is thus supported by three groups of blades, arranged, horizontally, at the corners of a triangle, so that the waves originated by the anterior blade groups do not disturb the working of the posterior ones. Other suitable arrangements of the blade groups, for instance, in form of a trapezium, may also be adopted for the same purpose. The angle of inclination of the blades can be varied by turning the beams B and B' about their longitudinal axes. Through this turning of the beams it is also possible fully to withdraw the blades from water. The machine is provided with air propellers E $E^2$ revolving in opposite directions and mounted on suitable shafts $i$ $i$ and $e$, $e$; a motor F connected with the shafts by chains $f'$ $f^2$ being designed to drive the screw-propellers. In Figs. 18, 19 I have shown also how the area of the blades of a group may decrease downward. Through this or similar arrangement a smaller number of blades is needed, whereby the upper larger ones are intended for the starting of the machine and for traveling at low speed.

In Figs. 21 and 22, I have illustrated a similar apparatus, in which two air propellers E′ E² are used, both being disposed at the stern of the body portion or hull on arms extending laterally therefrom and having a wing-like form as shown in Fig. 23. The shafts $i$, $i$ and driving gearing $e′$ $e^2$ should be covered by wing-like jackets H¹. This machine also illustrates a further departure by using an air rudder T.

Figs. 24 and 25 illustrate a further structure of my invention. In this example, the shaft of the screw-propellers is disposed substantially on the axis of the hull. In order to prevent the hull from being rotated, I may use two propellers E⁴, E⁵, one being arranged at the stern and the other one at the stem. They might be located, however, both at the stem or both at the stern, in which cases, however, they should be made of different diameters. In all cases, they must rotate in opposite directions to counteract the reactions due to their rotation. Another suitable arrangement consists in using only one aerial propeller, and counteracting its reaction on the body portion through suitable distribution of weights.

Fig. 26 gives an example of a big blade supported on a plurality of legs G G in such a way that two or more legs result on the same longitudinal cross-section, whereby the thickness of the blade can be reduced. The example also shows a means to regulate the slope of the blades. For this purpose, the legs G G are pivotally supported on a common bracket $g^5$. A link $g^6$ connected to the legs G G serves to adjust the angle.

In Fig. 27 I illustrate how my improved blades may be applied to the hull C of a boat in order to decrease its draft, or to raise its stern, and thereby to improve its water line and to increase its speed without increasing the resistance of the water. For this purpose, I arrange legs G and blades $a$ at suitable points on the sides of the hull. In the present example, where the intention is merely to raise the stern, the blades are disposed near the stern. Fig. 28 shows how it is possible to apply to a little boat, for instance, of one ton, two blades at the stem, and two at the stern, each blade having a length (in the direction of travel) of 5 ctm. and a breadth of 5 meters.

In Figs. 29 to 31, I illustrate my improved complete hydroflying machine, provided both with surfaces utilizing the dynamic reaction of the water and surfaces utilizing the dynamic reaction of the air. The machine consists of the body portion C, the water blades $a$, $a$, the air screw propellers E′, E², the motor F, the vertical air-rudder T, all these parts being substantially of the same structure as that described before. Apart from these members, however, I provide large air-blades, A A, mounted on the body portion C, and strengthened by suitable cross bars. These air blades are able to be removed at will when the machine is not to be used for traveling in the air; and suitable means are provided for the purpose of mechanically changing their total area, according to the variations of the speed. The horizontal rudder T′ is designed to regulate the travel of the machine above the surface of the water as well as in the air. The total surface of the water blades must be so large, that they support the machine, in coöperation with the air blades A, A at a low speed of the machine. In operating the machine, the aeronaut, after starting the machine on the surface of the water, will gradually increase its speed, so that one blade after the other rises above the surface of the water, until only the lowermost blade glides over the surface. In increasing the speed further, the machine will, at times, leave all contact with the water. During all these operations, the aeronaut will be assisted by the blades $a$ $a$ in upholding the equilibrium of the machine, because, as soon as the machine is a very little inclined to one side, a certain number of blades passes through the water on the side of the downward inclination, whereby the water exerts an upward pressure on the blades which prevents a further inclination and makes the same easily noticeable to the aeronaut, so, that he can intervene to reëstablish the equilibrium. After some practice, the aeronaut will have acquired sufficient skill in the operation of the machines so that he can leave the water entirely. But even then, the water blades will be very useful by giving a reliable means to start the machine and to stop the same gradually at the finish. On the other hand, air blades, as shown in Figs. 29 to 31, will also be used, to great advantage in hydroflying machines, that are not intended to travel in the air, inasmuch as they give the apparatus an additional support, that is not affected by the undesirable influence of the waves.

While I have described, in the foregoing forms of flying apparatus that are driven by machine-actuated propellers, I wish it to be understood that they may also be driven by the reaction of jets of any kind of material, (steam, water, fusees, etc.). Small apparatus may even entirely dispense with such motive power and may be driven by the hand of men, thereby affording a new craft to be used in races and for other purposes.

Having thus fully described my invention, what I claim as new and desire to secure by Letters Patent, is:—

1. In a water conveyance, a rod normally substantially vertical in combination with a plurality of normally approximately horizontal superposed supporting water-blades rigidly connected to said rod.

2. In a water conveyance, the combination with the hull of the same, of a normally substantially vertical rod connected to the hull, and a plurality of superimposed approximately horizontal supporting water-blades all rigidly connected with the said rod, so as to be stationary with respect to each other.

3. In a water conveyance, the combination with the hull of the same and a normally substantially vertical rod, of a plurality of supporting water-blades substantially perpendicular to and rigidly connected to said rod, and arranged below the hull.

4. In a water conveyance, a plurality of superposed blades, in combination with a connecting rod adapted to occupy an approximately vertical position said rod being transverse to and rigidly connected to said blades within their periphery, whereby the periphery of said blades is free and unobstructed at all points.

5. In a water conveyance, a plurality of superposed normally approximately horizontal blades, in combination with a normally substantially vertical connecting rod transverse and rigidly connected to said blades substantially on the geometrical locus of the centers of pressure of the longitudinal elements of the blades.

6. In a water conveyance, the combination with the hull or body of the same, of a beam projecting from said body transversely thereto, a rod normally extending in a substantially vertical direction and carried by and depending from said beam, and superposed supporting blades, all rigidly connected to said rod.

7. In a water conveyance, the combination with the hull or body of the same, of a beam, journaled in or projecting to both sides from said body transversely thereto, a rod extending downward from each projecting end of the beam in a normally substantially vertical direction, and a series of superposed supporting blades rigidly connected to each rod transversely thereto.

8. In a water conveyance, a hull or body, in combination with superposed supporting blades, and a rod depending in a normally substantially vertical direction from said body, said rod passing through and rigidly secured to said supporting blades.

9. In a water conveyance, the combination with the hull or body portion of the same, and a rod normally depending from said body portion in a substantially vertical direction, of a plurality of supporting blades placed at different levels said rod passing through the said blades and rigidly connected to the same, said blades decreasing in area from the uppermost to the lowermost blade.

10. In a water conveyance, the combination with the hull or body portion of the same and a depending rod supported from the hull, of several series of normally approximately horizontal supporting water-blades placed one above the other and rigidly connected to the rod in the form of a grate, the blades of said series descreasing in area from the upper to the lower blade.

11. In a water-conveyance, the combination with the hull or body of the same and a depending rod supported from the hull, of superposed supporting blades rigidly connected to the rod, one or more of said blades being substantially in the form of a solid of uniform flexure strength with relation to the point of connection of said blade.

12. In a water conveyance, a solid supporting water-blade concave at its bottom, having front and rear thinned edges, and tapering toward the lateral ends.

13. In a water conveyance, the combination of the hull with a water-guided part exposed to the resistance of the surrounding medium, said part being of lenticular cross-section, the greatest thickness of said part being at a point toward the front edge of the same.

14. In a water conveyance, the combination with the hull or body portion thereof, of a rod transversely connected to a beam mounted on the hull transversely thereto and out of the water, and superposed supporting blades transverse to and rigidly connected to said rod, the rod being adjustable in said beam in the direction of its length.

15. In a water conveyance, a hull in combination with a water supporting device consisting of a number of approximately horizontal plates spaced apart and a depending rod passing through said plates and rigidly connected to the same.

16. In a water conveyance, a transverse beam supported on the hull, in combination with depending rods rigidly connected thereto, and a series of water supporting blades rigidly secured to the rods.

17. In a water conveyance, a hull or body-portion, in combination with a water supporting device formed of a rod and a series of superposed metal plates spaced apart and rigidly connected to the rod, the rod and series being substantially vertical.

18. In a water conveyance, a hull or body portion, in combination with a water blade, a carrying member for the same mounted on the hull, and a resilient connection between said carrying member and the hull.

19. In a water conveyance, the combination with the hull, or body portion, of the same, of a downwardly extending supporting blade mounted on the hull, a supplemental blade substantially parallel to the supporting blade, a vibratory support for the supplemental blade, mounted on the hull, and a connection between said vibratory support and the pendant supporting blade.

20. In a water conveyance, the combination with a body portion or hull, of a plurality of superposed blades and telescoping tubular carrying rods for said blades, said tubular carrying rods being attached at their ends to the respective blades.

21. In a water conveyance, the combination with a body portion or hull, of a supporting water blade, and a water rudder of downwardly tapering form and detached from the hull of the vessel.

In testimony whereof I affix my signature to this specification in the presence of two witnesses.

ENRICO FORLANINI.

Witnesses:
 MICHELE DE DRAGO,
 B. CARLO SALVOTTI.